Aug. 9, 1960 H. W. HEIDERGOTT ET AL 2,948,304

APPARATUS FOR FILLING AND CAPPING TELEPHONE TRANSMITTER COMPONENTS

Filed Oct. 29, 1957 6 Sheets-Sheet 1

INVENTORS
H.W. HEIDERGOTT
W.O. SIMPSON
BY R. P. Miller
ATTORNEY

INVENTORS
H.W. HEIDERGOTT
W.O. SIMPSON
BY R. P. Miller
ATTORNEY

INVENTORS
H. W. HEIDERGOTT
W. O. SIMPSON
BY R. P. Miller
ATTORNEY

Aug. 9, 1960 H. W. HEIDERGOTT ET AL 2,948,304

APPARATUS FOR FILLING AND CAPPING TELEPHONE TRANSMITTER COMPONENTS

Filed Oct. 29, 1957 6 Sheets-Sheet 4

INVENTORS
H.W. HEIDERGOTT
W.O. SIMPSON
BY R. P. Miller
ATTORNEY

INVENTORS
H. W. HEIDERGOTT
W. O. SIMPSON
BY R. P. Miller
ATTORNEY

Aug. 9, 1960 H. W. HEIDERGOTT ET AL 2,948,304

APPARATUS FOR FILLING AND CAPPING TELEPHONE TRANSMITTER COMPONENTS

Filed Oct. 29, 1957 6 Sheets-Sheet 6

INVENTORS
H.W. HEIDERGOTT
W.D. SIMPSON
BY R. P. Miller
ATTORNEY 2,948,304
Patented Aug. 9, 1960

2,948,304

APPARATUS FOR FILLING AND CAPPING TELEPHONE TRANSMITTER COMPONENTS

Harry W. Heidergott, Indianapolis, Ind., and Warren O. Simpson, Findlay, Ohio, assignors to Western Electric Company, Incorporated, New York, N.Y., a corporation of New York Filed Oct. 29, 1957, Ser. No. 693,115
12 Claims. (Cl. 141—75)

This invention relates to an apparatus for filling and capping telephone transmitter components, and more particularly to an automatic machine for sequentially filling a cavity of a telephone component with a metered amount of carbon granules and then applying a metallic cap over the cavity.

In the manufacture of one type of telephone transmitter component it is necessary to fill a cavity formed in the component with a precise metered amount of carbon granules. In order to secure uniform quality of the components it is a requirement that the carbon granules be uniformly distributed and packed within each cavity of a fabricated transmitter. The packing must be such that subsequent mechanical jarring or electrical shock of the transmitter will not disturb the distribution of the carbon granules. However, packing should not be so great that the transmitter loses any of the desired sensitivity. In order to confine the carbon granules within the cavity, it is necessary to apply a metallic cap over the cavity without unduly compacting the granules confined therein. It is a further requisite that these various operations be carried out with a minimum amount of manual handling in order to avoid contamination of the carbon granules.

It is a prime object of this invention to provide an automatic machine for sequentially filling a component with a metered amount of granular material and capping the material within the component.

Another object of the invention resides in instrumentalities for lifting a component from an indexible carrier and filling the component with a precise amount of granular material.

An additional object of the invention is the provision of a vibrator adapted to engage and impart vibrations to the component to settle the carbon granules while the component is held in an elevated position.

A further object of the invention is the provision of instrumentalities for fabricating and applying a cap to the component on the carrier to confine the granular material therein.

A still further object of the invention resides in new and improved automatic control facilities for sequentially indexing components in a positive manner from a source of supply through a pair of stations whereat filling and capping operations are performed together with facilities for interrupting the operation of the mechanisms at the various stations upon ascertainment of an absence of a component on the carrier.

With these and other objects in view the present invention contemplates a cyclically operable control unit for actuating a pusher to advance telephone transmitter components from a chute onto an indexible carrier whereafter the components are sequentially advanced through a carbon granule filling station and cap forming and applying station. At the metering station a nozzle of a metering device moves into engagement with the component and the metering device subsequently functions to feed a precise amount of carbon granules to a cavity formed in the component. Gripping members mounted on the metering device are rendered effective to grip and elevate the component from the carrier. While the component is held in an elevated position, a vibratory mechanism is actuated to vibrate the component to fully settle and distribute the granules through the cavity. The granular filled component is next returned to the carrier and subsequently advanced to the capping station wherein a metallic cap is blanked and crimped onto the component to confine the granules therein.

Other objects and advantages of the present invention will be apparent from the following detailed description when considered in conjunction with the accompanying drawings, wherein Fig. 1 is a top plan view of an apparatus for sequentially filling and capping transmitter components embodying the principal features of the invention;

*General description and feed mechanism*

Figure 1:
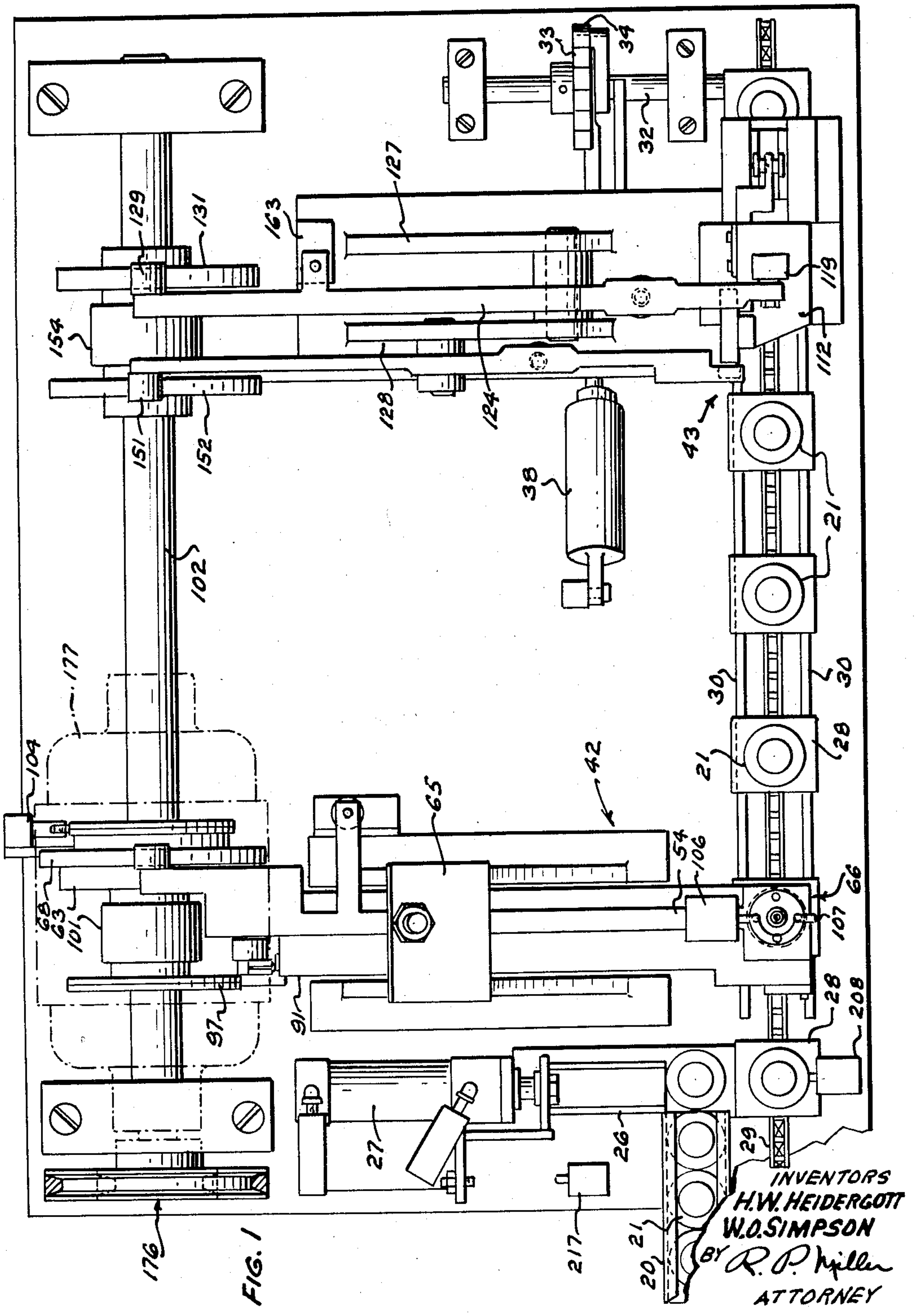
Figures 2, 12, 13, 14:
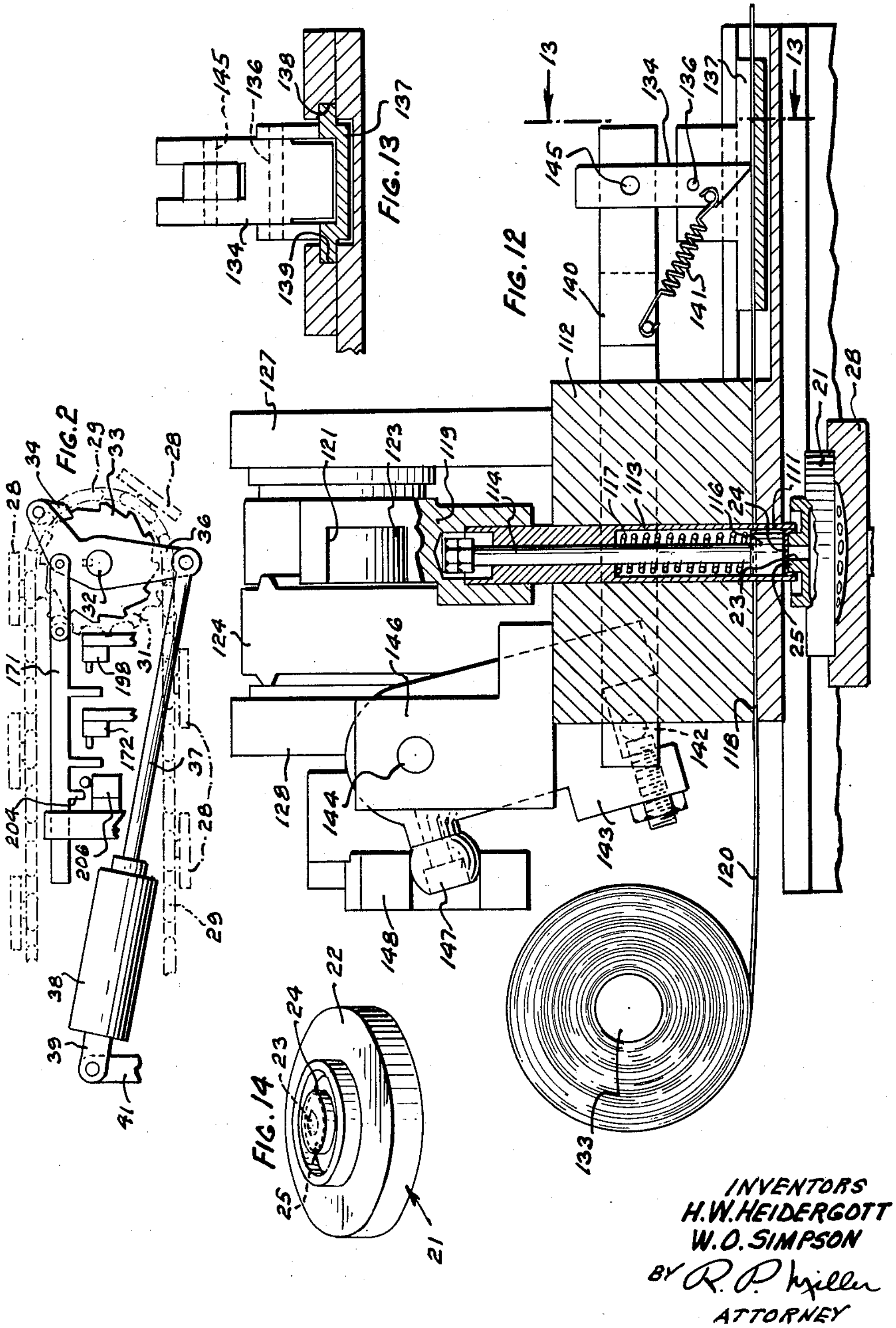
Fig. 2 is a partial side view of a carrier and a mechanism for indexing the carrier to feed components through the apparatus shown in Fig. 1.
Fig. 12 is an enlarged front view partially in section that illustrates a metallic stock feeding arrangement for the capping mechanism.
Fig. 13 is a sectional view taken along lines 13—13 of Fig. 12 illustrating a metallic stock gripping an advancing pawl.
Fig. 14 is a perspective view of a transmitter component fabricated by the apparatus shown in the other figures.
Figure 3:
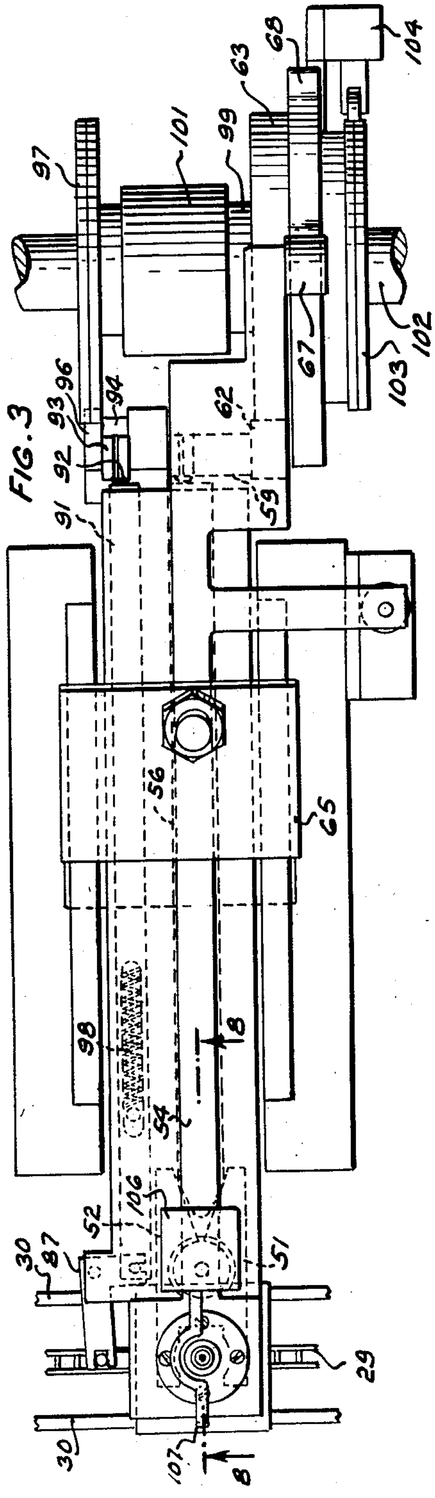
Fig. 3 is a top plan view of a mechanism for metering granules into a transmitter component.
Figure 4:
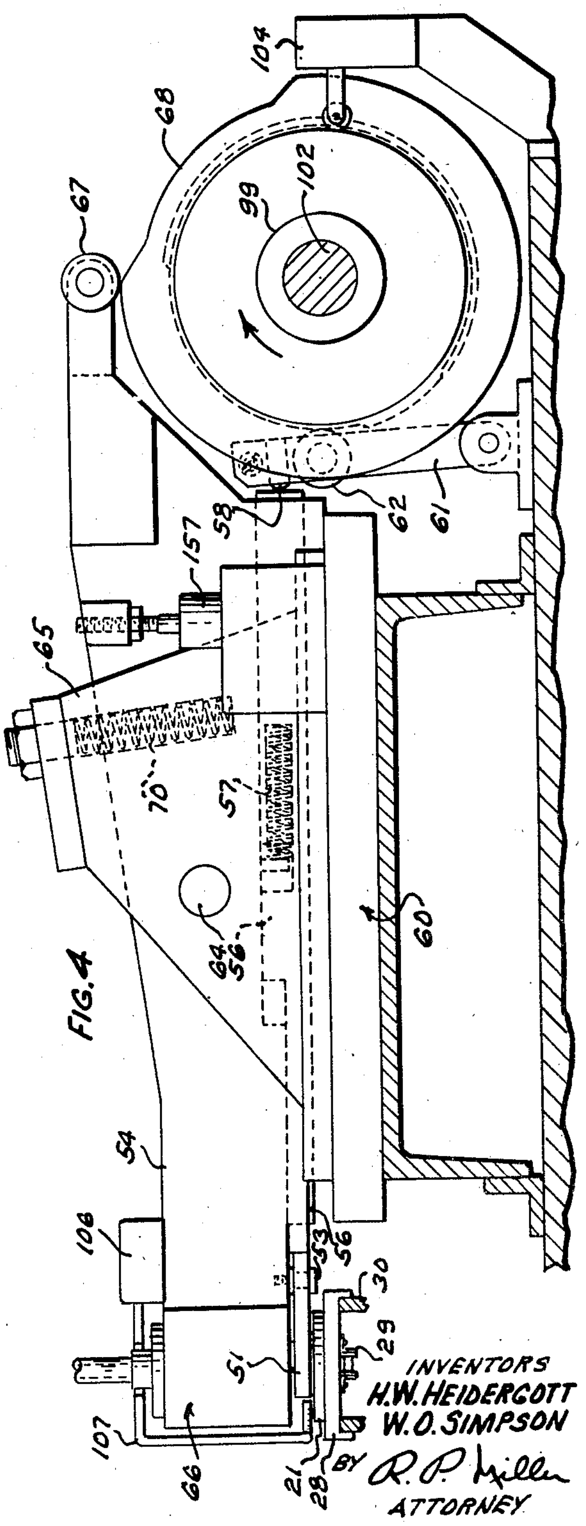
Fig. 4 is a side elevational view of the metering mechanism shown in Fig. 3.

Referring to Fig. 1, there is shown a gravity chute 20 down which telephone transmitter components 21 pass. In Fig. 14 there is shown a perspective view of a typical telephone transmitter component that is fabricated by the apparatus shown in the drawings. The component consists of a disc-like body member 22 having a cavity 23 formed in a boss 25 and into which it is desired to feed a metered amount of carbon granules. It is further desired that the apparatus apply a metallic cap 24 over the cavity. The leading component 21 is positioned in register with a pusher 26 that is adapted to be cyclically reciprocated through the instrumentality of an air cylinder 27. Pusher 26 upon being operated advances the leading component 21 onto one of a series of carriers 28 mounted on a chain 29.

The righthand extremity of the chain 29 is positioned on a sprocket 31 mounted on a shaft 32 (see Figs. 1 and 2). Shaft 32 has a ratchet 33 keyed thereto that is adapted to be incrementally advanced through the agency of a pawl 34 that is mounted on a lever 36 rotatably mounted on the shaft 32. The lower extremity of the lever 36 is connected to a link 37 that in turn is secured to a piston positioned within an air cylinder 38 having a clevis 39 secured to the rear portion thereof. Clevis 39 is pivotally mounted on a bracket 41 secured to the frame of the apparatus. Upon operation of the air cylinder 38, the lever 36 will be oscillated about the shaft 32 to move the pawl 34 to advance the ratchet 33, and as a consequence, the shaft 32 and sprocket 31 are rotated to advance the chain 29 and the carriers 28 along guide rails 30.

The carriers 28 first advance the transmitter components 21 to a metering mechanism station generally designated by the reference numeral 42 whereat the component is engaged by a nozzle on the metering device. A metered amount of carbon granules is fed into the cavity 23 of the component 21 and thereafter the component is lifted from the carrier 28 and vibrated. The component is then released to drop back onto the carrier 28. Subsequent advance of the carriers 28 advances each component to a capping mechanism station 43 whereat facilities are rendered effective to fabricate a metallic cap 24 and crimp it onto the component to cover the cavity 23. Further advance of the carriers 28 move the fabricated transmitter components around the sprocket 31 whereupon each component drops into a receiving hopper (not shown).

*Metering mechanism*

Referring now to Figs. 3–9 wherein the details of the metering mechanism 42 are shown, the carrier 28 advances the component 21 into register with a pair of gripping jaws 51 and 52 that are pivotally mounted on a stud shaft 53 secured to a pivotally mounted frame 54. As viewed in Fig. 6, a spring 55 is provided to normally hold the jaws 51 and 52 spread apart. The trailing extremities of the jaws 51 and 52 are beveled to receive an actuator slide 56 that is slidably mounted within the frame 54. The actuator slide is urged by a spring 57 into engagement with a button 58 mounted on an arm 59 secured to a pivotally mounted lever 61. Rotatably mounted near the upper extremity of the lever 61 is a cam follower roller 62 adapted to follow the contour of a cam 63.

The frame 54 is pivotally mounted on a shaft 64 secured within a bracket 65 extending from a base or frame 60 for the entire machine. Frame 54 carries the gripping jaws 51 and 52 and the actuating mechanisms therefor and a metering device generally designated by the reference numeral 66. At the trailing extremity of the frame 54 is a cam follower roller 67 adapted to follow the contour of a cam 68. Contact between the cam follower roller 67 and the cam 68 is maintained through the agency of a compression spring 70 that is mounted between sections of the frame 54 and the bracket 65.

Figures 5, 6, 7, 8, 9:
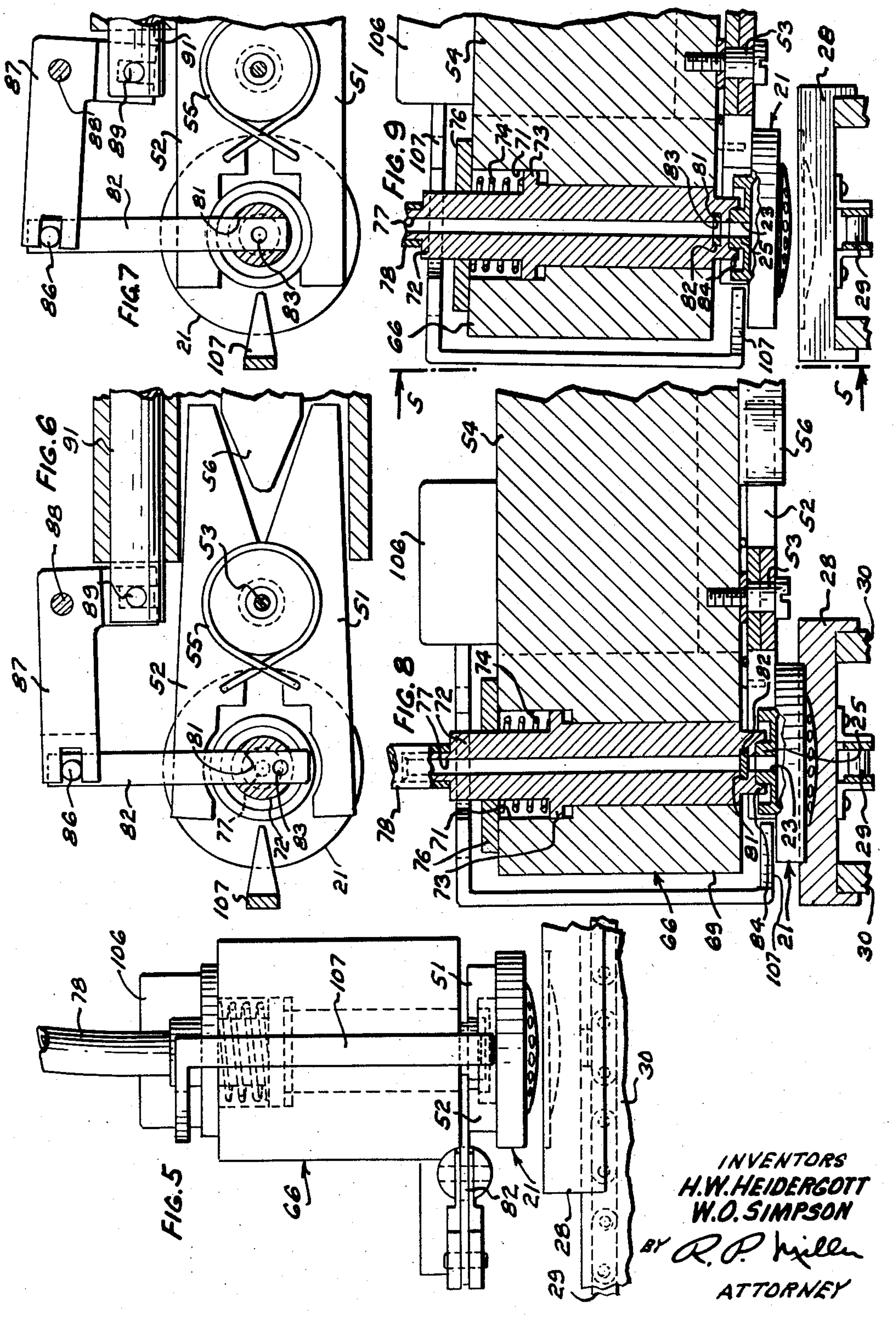
Fig. 5 is a front elevational view of the metering mechanism shown in Fig. 3.
Figs. 6 and 7 illustrate enlarged top plan views of two positions of a pair of gripping jaws within the metering mechanism shown in Fig. 3.
Figs. 8 and 9 illustrate enlarged sectional views taken along line 8—8 of Fig. 3 showing the metering mechanism in two positions during a cycle of operation of the overall apparatus.
Figures 10, 11:
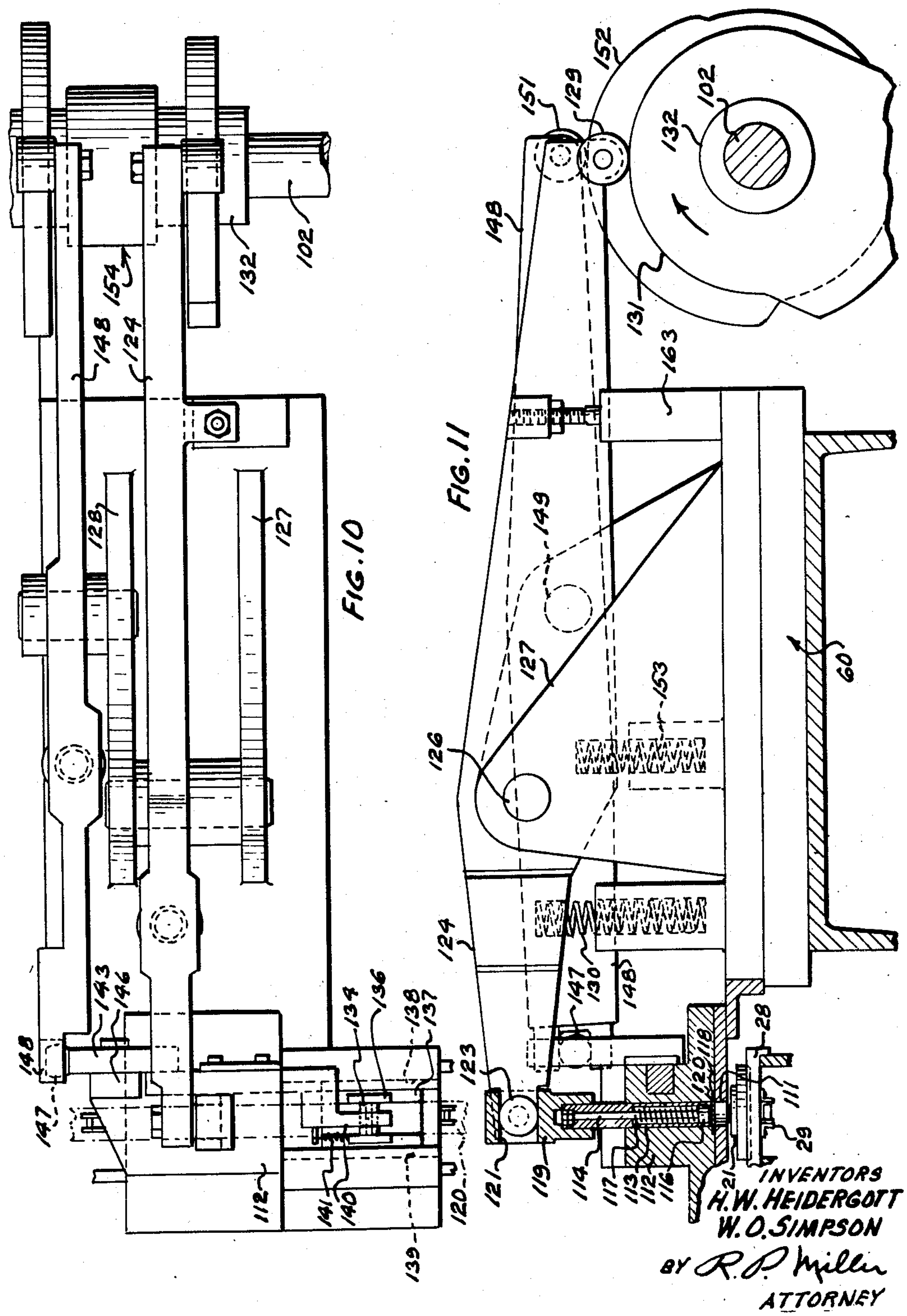
Fig. 10 is a top plan view of a mechanism for fabricating and applying caps to a transmitter component advanced by the carrier.
Fig. 11 is a front view partially in section of the capping mechanism shown in Fig. 10.

Referring to Figs. 8 and 9, the metering device 66 comprises a block 69 having a circular hole or aperture 71 formed therein to receive a sleeve 72. Sleeve 72 has a flange 73 formed thereon that is engaged by a spring 74 acting on a collar 76 secured to the block 69. The sleeve 72 is provided with a central aperture or passageway 77 that communicates with a hose 78 connected to a source of carbon granular material (not shown).

As best shown in Figs. 6 and 7 the sleeve 72 is provided with a transverse slot 81 having a metering slide 82 slidably mounted therein. The slide 82 is provided with an aperture 83 that may be selectively moved in register with the aperture 77 to permit the passage of carbon granules into a cavity 23 formed in the positioned transmitter component 21. The sleeve 72 is also provided with a nozzle section 84 that engages the boss 25 surrounding the cavity 23.

There is mounted on the slide 82 a pin 86 adapted to fit within a slot formed in a bell crank lever 87 that is pivotally mounted about a stud shaft 88 secured to the frame 54. A second bifurcated section of the bell crank lever 87 engages a pin 89 mounted on a slide rod 91. The rear extremity of the slide rod 91 (see Fig. 3) engages a button 92 secured to an arm 93 that is attached to a lever 94 which is substantially similar to the lever 61. The lever 94 has a cam follower roller 96 rotatably mounted thereon that is adapted to follow the contour of the cam 97. Engagement between the cam follower roller 96 and the cam 97 is maintained through the agency of a spring 98 attached to the slide rod 91 and the frame 54.

Cams 63, 68 and 97 are mounted on a hub 99 connected to a one-revolution clutch 101 that is selectively engageable with a constantly rotating shaft 102. In addition, a cam 103 is also mounted on the hub 99 and is adapted to actuate a switch 104. When switch 104 is actuated a circuit is completed to an electromechanical unit 106 that functions to impart rapid vibrations to a resilient lever 107. It will be noted that the lower extremity of the lever 107 is positioned in close proximity to the positioned transmitter component 21; consequently, upon actuation of the unit 106 the lever 107 will vibrate and engage the positioned component to settle and uniformly distribute the carbon granules fed into the cavity 23.

In operation of the metering device, the release of the one-revolution clutch 101 imparts rotation to the cams 63, 68, 97 and 103. Roller 67 rides initially on a low portion of the cam 68 and as a result the frame 54 and the components attached thereto are elevated from the path of the carriers 28. However, upon initiation of movement of the cam 68, the cam follower roller 67 rides up on the high portion of the cam 68 to pivot the frame 54 in a counterclockwise direction moving the metering head 66 toward the positioned transmitter component 21. The nozzle 84 of the spring-biased sleeve 72 engages the boss portion 25 of the transmitter to position the aperture 77 in alignment with the cavity 23. The cam 63 then functions to move the slide 56 against the action of the spring 57 to move the nose portion thereof into engagement with the beveled rear extremity of the jaw members 51 and 52. The jaw members 51 and 52 thereupon pivot about the stud shaft 53 to engage and grip the component 21.

The cam 97 now presents a high portion to the follower 96 thereby causing the slide rod 91 to move toward the left causing the bell crank 87 to pivot and move the slide 82 so that the aperture 83 is positioned in register with the aperture 77. The carbon granular material is then permitted to fall into the cavity 23. Cam 97 then again presents a low portion to the cam follower roller 96 causing the slide rod 91 to move toward the right to pivot the bell crank 87 to again move the aperture 83 from registration with the aperture 77. It may be therefore appreciated that a metered amount of carbon granular material is fed into the cavity 23 which is dependent upon the time of effectiveness of the high portion of the cam 97.

Cam 68 now presents a low portion of the cam follower 67 to pivot the frame in a clockwise direction thereby moving all of the component mechanisms mounted therein together with the transmitter component 21 now held by the jaws 51 and 52. The cam 103 is then rendered effective to operate the switch 104 whereupon the unit 106 is actuated to impart vibrations to the lever 107. Lever 107 rapidly engages and disengages the component 21 to impart vibrations thereto to settle and uniformly distribute the carbon granules now positioned within the cavity 23. The cam 63 then permits the follower 62 and the lever 61 to move toward the right. The actuator slide 56 moves under the urging of the spring 57 to withdraw the nose portion thereof from engagement with the beveled sections of the gripping jaws 51 and 52. The spring 55 thereupon separates the jaws to release the transmitter component 21 whereupon said component drops into a recess formed in the carrier 28.

*Capping mechanism*

Referring now to Figs. 10 to 13 wherein the details of the capping mechanism 43 are shown, the carrier 28 advances a transmitter component 21 into alignment with a circular aperture 111 formed in a block 112 that is secured to the frame 60 of the machine. Positioned within the aperture 111 is a sleeve-like blanking and crimping die 113 having a slide rod 114 slidably mounted therein. Attached to the lower extremity of the rod 114 is a holding pad 116 that is urged downwardly through the agency of a compression spring 117. Block 112 has a slot 118 running therethrough in a direction transverse to the direction of the aperture 111. Thin metallic stock 120 is adapted to be fed through the slot 118 so that the sleeve die 113 can blank out and apply a section onto the boss 25 of the component 21 to cap the cavity 23.

The upper portion of sleeve die 113 is pinned to a yoke 119 having a slot 121 formed therein to accommodate a roller 123 mounted on a lever 124. This lever is pivotally mounted on a shaft 126 that is mounted within brackets 127 and 128 secured to the frame of the machine. The trailing extremity of the lever 124 has mounted thereon a rotatable roller 129. A spring 130 engages the lever 124 to force the roller 129 into engagement with a cam 131 mounted on a hub 132 that is in turn rotatably mounted on the shaft 102.

Attention is directed to Fig. 12 wherein the details for feeding the metal stock 120 are most clearly shown. A reel of stock 120 mounted on an arbor 133 is adapted to be incrementally advanced past the sleeve die 113 by means of a feed pawl 134. Feed pawl 134 is pivotally mounted by a pin 136 to a slide 137 mounted within guideways 138 and 139 formed as an extension of block 112 (Fig. 13). Pawl 134 is also pivotally mounted on a rod 140 by means of a pivot pin 145. A spring 141 interconnects the rod 140 and pawl 134 to continuously urge the pawl in a counterclockwise direction into engagement with the upper surface of the slide 137. The pawl 134 will grip the stock 120 between the lower extremity thereof and upper surface of the slide 137. The lefthand section of the rod 140 has a pin 142 secured therein and positioned within bifurcated extremities of a bell crank 143 pivotally mounted around a pivot stud 144 secured to a bracket 146 attached to the block 112. The bell crank 143 has a roller-like member 147 mounted on the other arm of the bell crank. Roller-like member 147 is mounted within a slotted extremity of an operating lever 148. Lever 148 is pivotally mounted by means of a stud shaft 149 secured to the bracket 128. Attached to the trailing extremity of the lever 148 in a rotatable fashion is a cam follower roller 151 adapted to ride upon the peripheral surface of a cam 152. Cam 152 is also mounted on the hub 132 that is rotatably mounted on the shaft 102. A compression spring 153 continuously urges the lever 148 to move the cam follower 151 into engagement with the cam 152. Interposed between the hub 132 and the shaft 102 is a one-revolution clutch generally designated by the reference numeral 154.

The capping mechanism shown in Figs. 10–13 is illustrated in the position where the feed mechanism has just completed a feed operation. However, when a carrier 28 initially positions a component 21 to be operated upon by the capping mechanism 43, the cams 131 and 152 are positioned to present low portions to the follower rollers 129 and 151. Upon operation of the one-revolution clutch 154, the cam 152 will present a lobed portion to the cam follower 151 to pivot the lever 148. Movement of lever 148 is imparted through the roller-like member 147 to the bell crank 143. In the initial position the bell crank 143 is positioned so that the pawl 134 and the slide 137 are positioned toward the left as viewed in Fig. 12. However, upon the bell crank 143 moving in a counterclockwise direction, the rod 140 will exert a force on the pin 145 and pawl 134 to force the pawl 134 into intimate engagement with the stock 120. The stock 120 will be pinched between the lower extremity of the pawl 134 and the upper surface of the slide 137. The pawl 134 and the slide 137 will advance as a unit to move a non-blanked section of the stock 120 into alignment with the sleeve die 113. Upon completion of the advance of the stock 120, cam 152 will again present a low portion to the cam follower roller 151 whereupon the feed mechanism will be moved toward the left to an initial position in anticipation of a subsequent cycle of operation.

As the hub 132 and cam 131 rotate, the cam 131 presents a lobed portion to the follower 129 to impart a pivotal movement to the lever 124 about the shaft 126. Lever 124 moves roller 123 within the slot 121 whereupon a downward movement is imparted to the yoke 119. The spring-urged pad 116 engages the stock 120 whereafter it is held stationary and the sleeve die 113 moves relative thereto and past the extremity of the pad to shear a circular disc-like blank from the stock. The spring 117 is then rendered effective to move the severed blank onto the boss 25 extending from the component 21. The pad functions to hold the severed blank in position on the boss while the sleeve die 113 again moves relative to the pad to crimp the peripheral portions of the severed blank about the boss. Upon the cam 131 again presenting a low portion to the roller 128 the severing and crimping sleeve die 113 is withdrawn to the initial position.

*Overall operation and control circuit*

Figure 15:
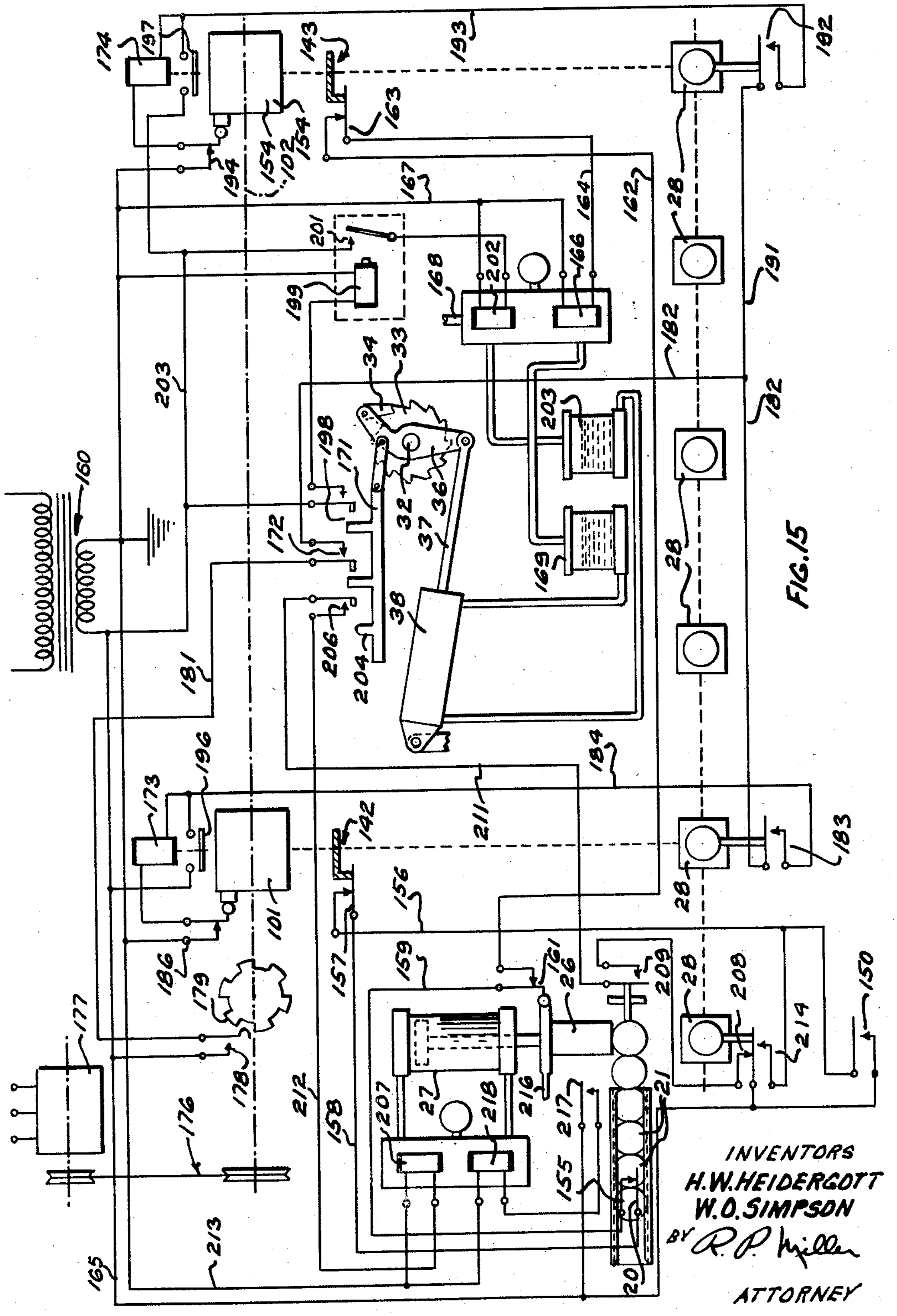
Fig. 15 is a schematic layout of a control circuit and the facilities operated thereby for effectuating the operation of the overall apparatus.

Considering now the overall operation of the apparatus with particular reference to the circuit diagram shown in Fig. 15, a cycle of operation of the machine is initiated by manual closure of a momentary switch 150. Assume that components 21 have been loaded in the chute 20 so that a sensing switch 155 positioned therein is closed. Then a circuit will be completed from the lefthand side of a power transformer 160, over a lead 165, through the switch 151, over a lead 156, through a switch 157 that is closed by the metering device 42 in an initial or rest position, over a lead 158, through the switch 155, over a lead 159, through a switch 161 closed by the pusher 26 being in a retracted position, over a lead 162, through a switch 163 closed by the capping mechanism 43 being in the initial position, over a lead 164, through a solenoid 166 and over a lead 167 to the grounded side of the transformer 160. Operation of solenoid 166 opens a valve (not shown) connecting an air line 168 with hydraulic reservoir 169. Hydraulic fluid is applied to the cylinder 38 to withdraw the rod 37 thereby pivoting the lever 36 to advance the pawl 34 and ratchet 33. It will be recalled that the ratchet 33 is connected to the shaft 32 that functions to advance the chain 29 and the carriers mounted thereon.

Advance of the lever 36 also effectuates the advance of an actuator rod 171. Upon completion of the advance of the rod 171, an extension thereof actuates a switch 172 that completes circuits to operate a solenoid 173 and a solenoid 174 that function to operate the one-revolution clutches 101 and 154 thereby initiating a cycle of operation of the metering mechanism 42 and the capping mechanism 43. Clutches 101 and 154 connect power to the mechanisms 42 and 43 from the constantly rotating shaft 32 that is in turn driven through a pulley belt or chain arrangement 176 by a constantly rotating motor 177.

The circuit for operating the solenoid 173 may be traced from the lefthand section of the transformer 160 over the lead 165, through a contact 178 closed by a constantly rotating commutator 179, over a lead 181, through the now closed switch 172, over a lead 182, through a sensing switch 183 that ascertains the presence of a component 21 in the metering device 42, over a lead 184, through the solenoid 173, through a switch 186 held closed by the clutch 101 in the rest position to the grounded side of the transformer 160. The circuit for operating the solenoid 174 may be traced from the lefthand section of the transformer 160, over the lead 165, through the commutator contacts 178, over the lead 181, through the switch 172, over the lead 182, over a lead 191, through a sensing switch 192 that ascertains the presence of a component 21 in the capping mechanism 43, over a lead 193 through the solenoid 174, through a switch 194 held closed by the clutch 154 being in the initial position to the grounded side of the transformer 160.

The commutator 179 is provided to insure that the drive members of the clutches 101 and 154 mounted on the shaft 32 are in proper position at the time that the solenoids 173 and 174 are operated to move the driven elements of the clutches into clutching positions. Operation of solenoids 173 and 174 also draws up contacts 196 and 197 to complete obvious by-pass circuits around the commutator contacts 178 and the switches 186 and 194. The metering mechanism 42 and the capping mechanism 43 now execute a cycle of operation to feed a metered amount of carbon granules to a first component 21 and cap a second component 21.

When the rod 171 moved to the righthand position, an extension thereof also closed a switch 198 to operate a time delay relay 199. After a relatively short period of time which is considerably less than that required for the metering mechanism 42 and the capping mechanism 43 to execute a cycle of operation, the relay 199 will draw up contacts 201 to complete a circuit for a solenoid 202 which may be traced from the lefthand side of the transformer 160, over a lead 203, through the contacts 201, through the solenoid 202 and over the lead 167 to the grounded side of the transformer. Solenoid 202 energizes to again operate the valve (not shown) connected to the air line 168 to apply the air pressure to a hydraulic reservoir 203. Hydraulic fluid then is passed to the lefthand extremity of the cylinder 38 to restore the rod and the mechanism attached thereto to the initial lefhand position. The switch 172 is immediately opened to interrupt the locking circuits through contacts 196 and 197 to release the solenoids 173 and 174 in anticipation of the next cycle of operation of the overall apparatus.

As the rod 171 moves toward the left an extension 204 thereon actuates a momentary switch 206 to complete a circuit for the energization of a solenoid 207. This circuit may be traced from the lefthand section of the transformer 160 over the lead 165, through a switch 208 that functions to ascertain the presence of a component 21 advanced by the pusher 26, through a switch 209 that is closed by the presence of a component 21 positioned in register with the pusher 26, over a lead 211, through the now closed switch 206, over a lead 212, through the windings of the solenoid 207 and over a lead 213 running to the grounded side of the transformer 160. Solenoid 207 controls a valve (not shown) to apply fluid to the upper end of the cylinder 27 that functions to advance the pusher 26 to move a component 21 onto a carrier 28 positioned in register therewith. Upon completion of the advance of the pusher 26, an extension 216 closes a switch 217 to complete an obvious circuit to a solenoid 218 that functions to operate a valve (not shown) to apply fluid to the lower portion of the cylinder 27 to cause the cylinder to withdraw the pusher 26 to the initial position.

The advanced component 21 opens the switch 208 and closes a switch 214 to condition the circuit for another cycle of operation. It will be noted that the switch 214 is connected in parallel with the start switch 150. Now if the metering mechanism 42 and the capping mechanism 43 have completed a cycle of operation, the switches 157 and 163 will be closed so that the initial starting circuit will again be completed to initiate the next cycle of operation of the machine. If the switches 183 and 192 do not ascertain the presence of a component 21 at the respective mechanisms then the associated mechanisms are not operated. If components 21 are not present in the chute 20 then the switch 155 is not closed so that another cycle of operation will not be initiated. Further, if the components 21 become jammed in the chute 20 so as to not permit the switch 209 to close, the operating circuit for the solenoid 207 is not completed and as a result another cycle of operation of the overall apparatus is precluded.

It is to be understood that the above-described arrangements of apparatus and construction of elemental parts are simply illustrative of an application of the principles of the invention and many other modifications may be made without departing from the invention.

What is claimed is:

1. In an apparatus for metering material into a component, a carrier for holding a component, means for advancing a metering head into engagement with the component, means for gripping the component, means for elevating the metering head and gripping means from the carrier, and means for vibrating the gripped elevated component.

2. In an apparatus for metering material into a component, a metering head having a passageway therethrough for the passage of said material, an element having an aperture formed therein and slidably mounted in said head to block the passageway, a pair of jaws for gripping the components, means for moving the metering head into engagement with the component and the jaws toward the component, means for actuating the jaws to grip the component, means for moving the element to position the aperture in alignment with the passageway, means for elevating the metering head and jaws with the component gripped therebetween.

3. In an apparatus for filling a component on a carrier, a pivotally mounted frame, a pair of resiliently urged spread apart jaws mounted on the frame, a head secured to the frame and having an aperture formed therein, a spring urged sleeve positioned within the aperture, said sleeve having a longitudinal passageway and a transverse slot, a metering slide mounted in the slot, a first linkage mounted in the frame for actuating the metering slide, a second linkage for actuating the jaws to grip a component, a first cam for pivoting the frame to move the sleeve into engagement with a component, a second cam secured to the first cam for operating the first linkage to move the metering slide, and a third cam secured to the other cams for operating the second linkage to actuate the jaws to grip the component.

4. In combination a carrier means for successively and incrementally advancing components having cavities formed therein, a control means for cyclically operating said carrier means, a pivotally mounted frame, a metering device mounted on said frame and having a nozzle portion, a pair of jaws mounted on said frame and adapted to grip and hold a component to position the cavity in register with the nozzle, means actuated by said control means between operations of said carrier for pivoting the frame toward and away from the carrier, means actuated by said control means for operating said jaws to grip and lift a component from the carrier upon movement of the frame away from the carrier, and means actuated by said control means for operating the metering device.

5. In a metering apparatus for filling components on a carrier with material, a frame, a block mounted on the frame and having an aperture formed therethrough, a sleeve having a passageway through which material is transferred to the components positioned within the aperture in the block, means for resiliently urging the sleeve to move through the aperture, means for holding the sleeve within the block, said sleeve having a slot formed transversely of the passageway, an apertured slide positioned within the slot, a pair of cams, means operated by one of said cams for pivoting the frame to move the sleeve into engagement with a component on the carrier, and means operated by the other cam for actuating said slide.

6. A metering head for granular material, comprising a block having a circular aperture formed therein, said aperture being of two diameters to provide a shoulder, a sleeve slidably mounted in the aperture and having an axial passageway therethrough and a flange formed thereon to engage the shoulder, a collar having an aperture formed therein secured to the block, a spring interposed between the flange and the collar to force the flange onto the shoulder, said sleeve having a transverse slot intersecting the passageway, and a slide member having an aperture formed therein slidably mounted within the slot.

7. In combination a pivotally mounted metering device, a pair of jaws movably mounted on the metering device, a carrier for advancing components to the metering device, control means for sequentially pivoting the metering device into engagement with a component on the carrier and actuating said jaws to grip the component, and means controlled by the presence of a component on the carrier for initiating operation of said control means.

8. In combination a carrier for advancing components, a fabricating machine for operating on the components on the carrier, means for incrementally advancing the carrier, means for ascertaining the presence of a component advanced to the fabricating machine, means operated conjointly by the ascertaining means and the carrier advancing means for initiating a cycle of operation of said fabricating machine, and means controlled by the completion of a cycle of operation of the fabricating machine for initiating operation of said carrier advancing means.

9. In combination a carrier for advancing components, a fabricating machine positioned to perform work operations on the components carried by the carrier, means for incrementally advancing the carrier to move successive components to the fabricating machine, means for cyclically advancing components to the carrier, means controlled by the advance of a component onto the carrier for initiating operation of said carrier advancing means, and means under the conjoint control of a component advanced to the fabricating machine and the completion of operation of the carrier advancing means for initiating a cycle of operation of the fabricating machine.

10. In combination a carrier for receiving components to be fabricated, a pusher for advancing components to the carrier, means for cyclically advancing the carrier, means for successively positioning components in register with the pusher, means for sensing the presence of components positioned in register with the pusher, means actuated by the conjoint action of the carrier advancing means and the pusher sensing means for operating the pusher to move a component onto the carrier, a fabricating machine for performing work operations on a component on the carrier, means for sensing the presence of components positioned on the carrier to be worked upon by the fabricating machine, and means controlled conjointly by the carrier advancing means and the carrier sensing means for operating the fabricating machine.

11. In combination a carrier for receiving components to be fabricated, means for cyclically advancing the carrier, a pusher for advacing components to the carrier, a first sensing means for ascertaining the presence of components on the carrier, means actuated by the first sensing means for operating the carrier advancing means, a second sensing means for ascertaining the presence of a components in register with the pusher, means actuated by the conjoint action of the carrier advancing means and the first and second sensing means for operating the pusher means, a fabricating machine for performing work operations on components on the carrier, a third sensing means for ascertaining the presence of components on the carrier in register with the fabricating machine, means operated conjointly by the carrier advancing means and the third sensing means for initiating a cycle of operation of the fabricating machine, and means actuated by the completion of a cycle of operation of the fabricating machine for operating conjointly with the first and second sensing means to initiate successive operations of the carrier advancing means.

12. A metering head for delivering granular material to components comprising a movable block having a circular aperture formed therein, an internal shoulder formed on the block and projecting into said aperture, a sleeve slidably mounted in the aperture and having an axial passageway extending therethrough and a traverse slot intersecting the passageway, said sleeve having a flange formed thereon to engage the shoulder, a nozzle portion formed on said sleeve and extending beyond the block to engage the components, a collar secured to the block for receiving the sleeve, a spring interposed between the collar and the flange to force the flange onto the shoulder, a slide member having an aperture formed therein slidably mounted within the slot, a pair of jaws mounted on said block for gripping and retaining a component in engagement with said nozzle portion during movement of the block, a vibratable arm having one end thereof in juxtaposition with the component gripper by the jaws, and means for vibrating said arm to impart vibrations to a component gripped by said jaws.

References Cited in the file of this patent

UNITED STATES PATENTS

| | | |
|---|---|---|
| 619,834 | Nickerson | Feb. 21, 1899 |
| 1,879,794 | Cundall | Sept. 27, 1932 |
| 2,583,106 | Kayat | Jan. 22, 1952 |
| 2,671,589 | Lasko | Mar. 9, 1954 |
| 2,697,543 | Sawyer et al. | Dec. 21, 1954 |
| 2,705,585 | Wise | Apr. 5, 1955 |
| 2,749,688 | Cozzoli | June 12, 1956 |
| 2,753,097 | Kindseth et al. | July 3, 1956 |
| 2,847,040 | McCarthy et al. | Aug. 12, 1958 |